(12) United States Patent
Keene et al.

(10) Patent No.: US 8,781,077 B2
(45) Date of Patent: Jul. 15, 2014

(54) METHOD AND SYSTEM FOR VALIDATING CHANNEL DISCREPANCIES

(75) Inventors: Robert A. Keene, Luray, VA (US);
Kavita G. Deshmukh, Fairfax, VA (US);
Neil A. Rogers, Carrollton, TX (US);
Doug L. Wekamp, Colorado Springs, CO (US); Elaine Van Horn, Oak Hill, VA (US); Connie A. Coffey, Gainesville, VA (US); Wendy L. Kaczmar, Catharpin, VA (US); Rachel I. Fetner, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/471,961

(22) Filed: May 15, 2012

(65) Prior Publication Data

US 2013/0308761 A1 Nov. 21, 2013

(51) Int. Cl.
*H04M 1/24* (2006.01)
*H04M 3/08* (2006.01)
*H04M 3/22* (2006.01)
*H04M 3/42* (2006.01)

(52) U.S. Cl.
USPC .................................. 379/15.03; 379/201.12

(58) Field of Classification Search
USPC .................... 379/9.03, 9.04, 15.03, 201.12
See application file for complete search history.

(56) References Cited

U.S. PATENT DOCUMENTS

| | | | |
|---|---|---|---|
| 6,295,540 B1 * | 9/2001 | Sanschagrin et al. | 379/9 |
| 7,738,640 B1 * | 6/2010 | Bajpay et al. | 379/114.04 |
| 2006/0059262 A1 * | 3/2006 | Adkinson et al. | 709/225 |
| 2006/0239428 A1 * | 10/2006 | Taylor | 379/126 |

* cited by examiner

*Primary Examiner* — Quoc D Tran

(57) ABSTRACT

An approach for analyzing data generated by a plurality of provisioning systems to validate the status of various assets of a service provider network is disclosed. A validation system retrieves provisioning data from a plurality of different provisioning systems and status data from a status monitoring system. The validation system analyzes the data to validate a discrepancy between the status and the current provisioning of the plurality of assets.

20 Claims, 9 Drawing Sheets

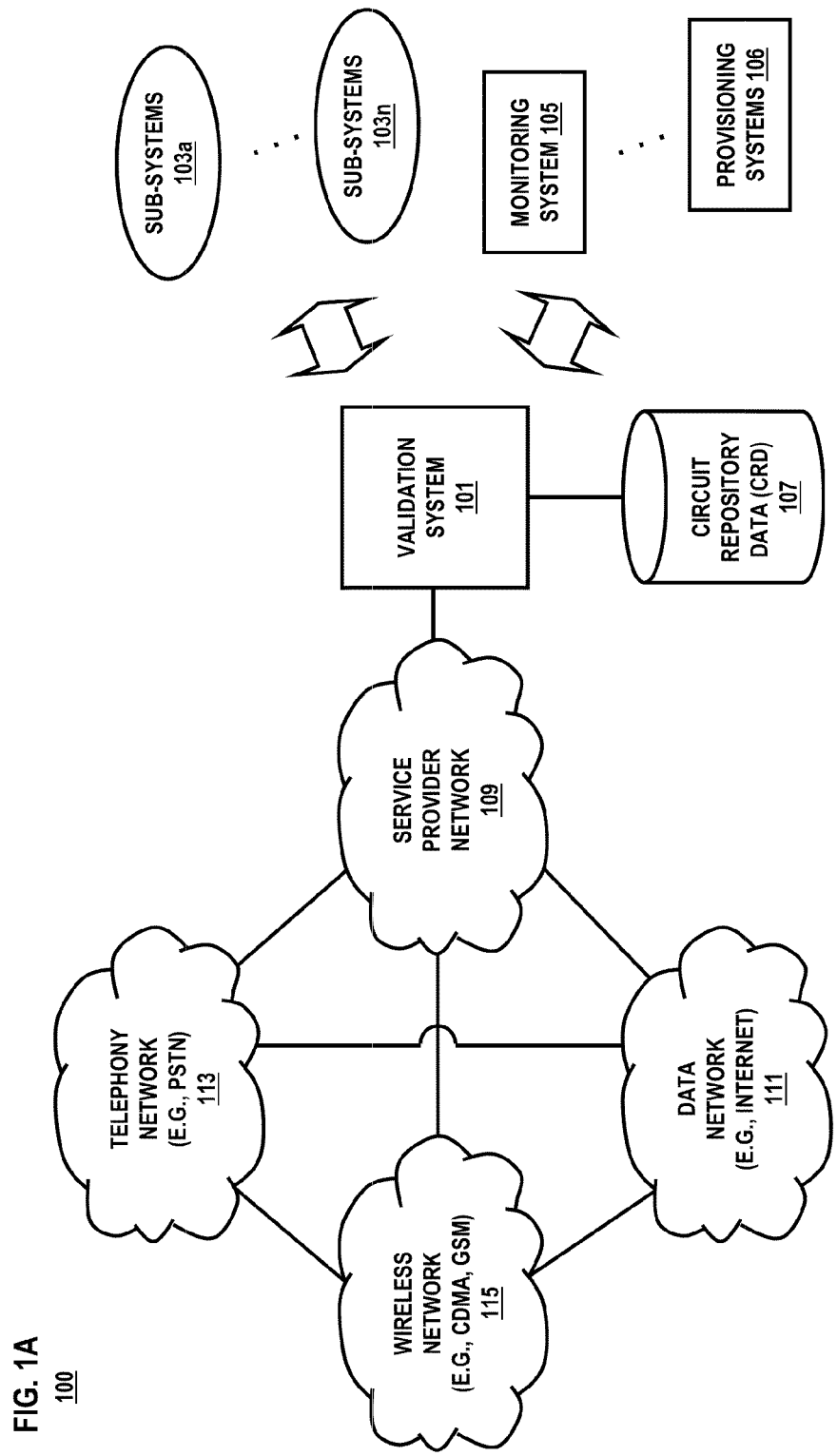

FIG. 3B
310

START → 
- 311: REANALYZE DATA PROVIDED BY THE PROVISIONING SYSTEM AND/OR DATA PROVIDED BY THE PLURALITY OF DIFFERENT MONITORING SYSTEMS BASED ON THE UPDATED STANDARDIZED DATA TO DETERMINE WHETHER THE DISCREPANCY IS ELIMINATED
- 313: UPDATE A PLURALITY OF ELEMENTS OF THE STANDARDIZED DATA BASED ON THE FEEDBACK
- 315: VALIDATE THE STANDARDIZED DATA BASED ON THE DETERMINATION
→ END

FIG. 3A
300

START →
- 301: RETRIEVE, FROM A PLURALITY OF DIFFERENT PROVISIONING SYSTEMS, DATA FOR INDICATING A CURRENT PROVISIONING OF A PLURALITY OF ASSETS OF A SERVICE PROVIDER
- 303: RETRIEVE, FROM A STATUS MONITORING SYSTEM, DATA FOR INDICATING A STATUS OF THE PLURALITY OF ASSETS
- 305: STANDARDIZE THE DATA PROVIDED BY THE PLURALITY OF DIFFERENT PROVISIONING SYSTEMS AND THE MONITORING SYSTEM
- 307: ANALYZE THE STANDARDIZED DATA TO VALIDATE A DISCREPANCY BETWEEN THE STATUS AND THE CURRENT PROVISIONING OF THE PLURALITY OF ASSETS
- 309: PROVIDE AS FEEDBACK TO THE MONITORING SYSTEM, REQUIREMENTS FOR RESOLVING THE DISCREPANCY BASED ON THE ANALYSIS
→ END

320

316

400

METHOD AND SYSTEM FOR VALIDATING CHANNEL DISCREPANCIES

BACKGROUND INFORMATION

Modern communication systems involve a delicate interplay of network components that support voice and data services. These systems are vital to business operations, such that downtime imposes a significant cost to the business. The impact of network failures (even very minor ones lasting only minutes) can be measured in thousands or even millions of dollars. In addition, how the various network components are provisioned for fulfilling specific tasks and customer requests is critical to the overall efficiency of the system. Typically, telecommunication service providers employ a number of different provisioning systems for managing the allocation and use of the various network components within their inventory. Unfortunately, the systems often employ different data structures, which results in discrepancies being determined by a monitoring system of the service provider. Furthermore, the service provider is limited in their ability to validate the accuracy of the discrepancies or the effectiveness of the corrective measures taken to eliminate them.

Based on the foregoing, there is a need for analyzing data generated by different provisioning systems to validate the status of various assets of a service provider network.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 1A and 1B are diagrams of a system capable of analyzing data generated by multiple provisioning systems to validate the status of various assets of a service provider network, according to various embodiments;

FIGS. 3A-3D are flowcharts of a process for analyzing data generated by multiple provisioning systems to validate the status of various assets of a service provider network, according to various embodiments;

DESCRIPTION OF THE PREFERRED EMBODIMENT

An apparatus, method, and software for analyzing data generated by multiple monitoring systems to validate the status of various assets of a service provider network, such as maintained by a telecommunications service provider for example, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to the coordinating of disparate systems, it is contemplated that these embodiments have applicability to systems operated by different organizations and to other operations wherein asset inventory information may be maintained in separate subsystems.

Figure 1B:
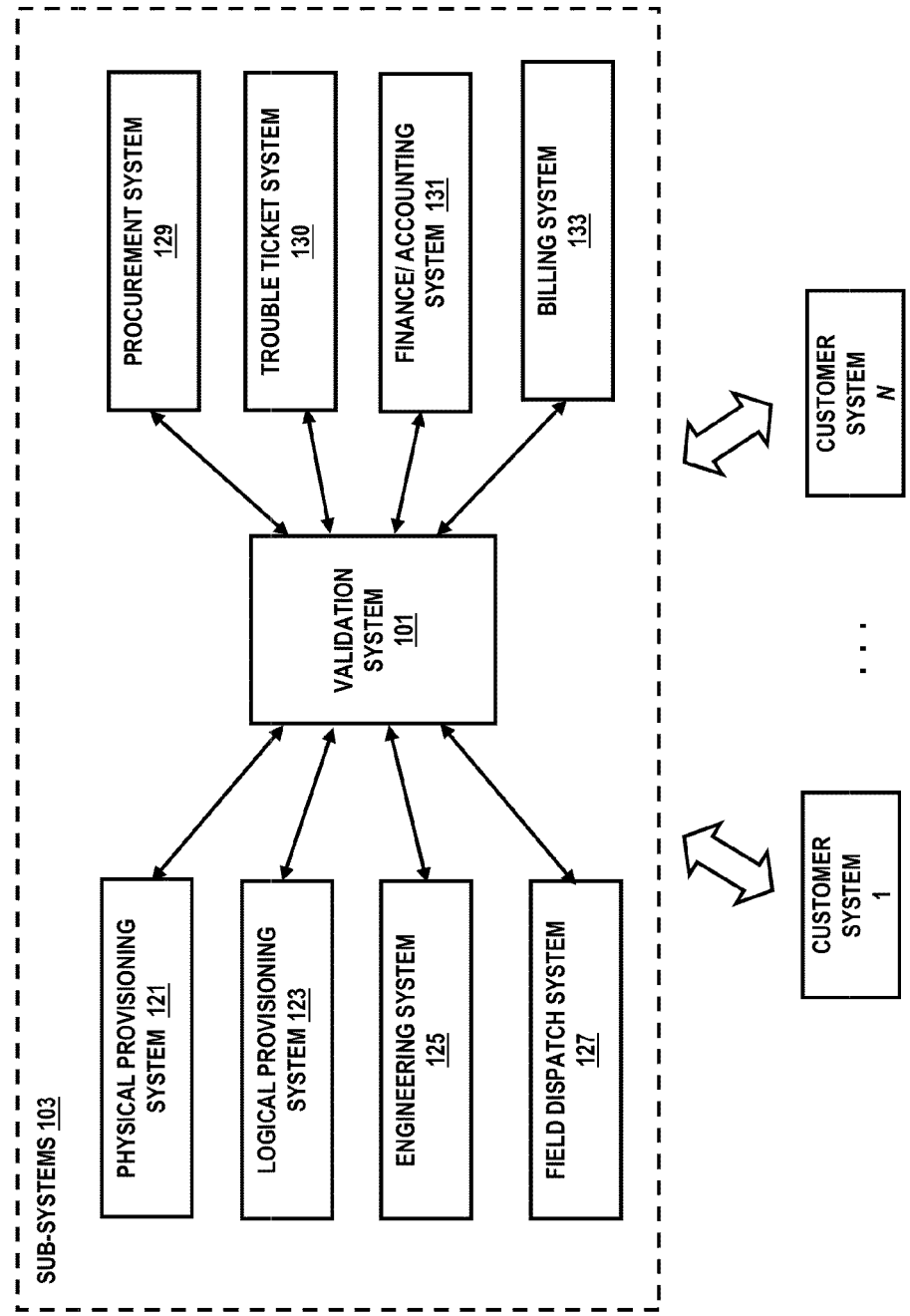

FIGS. 1A and 1B are diagrams of a system capable of analyzing data generated by multiple provisioning systems to validate the status of various assets of a service provider network, according to various embodiments. Service providers and other businesses may utilize several approaches to obtain accurate inventory information, including using a number of different provisioning systems and other asset/inventory management tools. Provisioning systems may include, for example, any tool (software) for informing the service provider of the current allocation or use of a particular arrangement of network components, or circuits, within the telecommunication network. For the purpose of illustration, the circuits represent a portion of the assets of the service provider. In addition, the provisioning system may indicate the current allotment of channels within a given circuit for enabling the fulfillment of specific customer orders or communication tasks. Various other tools, including status monitoring systems and other tools may also be employed for enabling accurate monitoring of the various assets.

Usually, the different systems for provisioning or monitoring are introduced to the service provider network as a result of acquisition or expansion. For example, in response to growing capacity requirements or customer needs, it is common for service providers to acquire additional network components to add to their existing telecommunication network. The acquired assets are often configured with different systems and sub-systems, all of which may process and convey data according to different data structures. Thus, discrepancies occur between the data and results returned by the different systems relative to the same assets or channels as provisioned. In addition, the service provider is forced to manually review and analyze multiple different reports or perform various manual reconciliation procedures just to verify the discrepancy between the results is legitimate or a mere function data/system incompatibility. While this validation task is vital to ensuring maximum use of the various assets, this is also a laborious and time intensive undertaking; especially as the daily demands for access to and use of the assets continues to grow. Unfortunately, there is currently no convenient, scalable solution for enabling a service provider to integrate and coordinate the data provided by the disparate systems to support comprehensive analysis and validation of channel status or asset provisioning.

The approach of system 100 stems, in part, from the recognition that management of data provided by disparate systems continues to be problematic for the service provider to ensure accurate validation of the status and use of assets. As shown, system 100 includes a validation system 101 that interacts with a multitude of sub-systems (or data systems) 103a-103n to collect inventory data relating to assets owned and/or managed by the service provider. Among these sub-systems 103a-103n is the validation system 101. In addition, the various sub-systems 103a-103n may include a monitoring system 105 as well as a plurality of different provisioning systems 106. It is noted also that the validation system 101 may be configured to operate in connection with the monitoring system 105, the one or more different provisioning systems 106 and the various other sub-systems 103a-103n for validating data returned regarding the various inventory/assets of the service provider network. In particular, the validation system 101 determines a validity of a discrepancy determined to occur between the different provisioning systems 106. This includes whether a match exists between various data elements of respective systems.

In certain embodiments, the monitoring system 105 may be implemented as a software tool for monitoring channel allocation, capacity and status information related to the various assets (circuits) of the service provider network. This includes information for indicating which channels provided by the various circuits of a service provider network, for fulfilling specific data needs or customer orders, are or are not available. In addition, the monitoring system 105 maintains information for indicating the current assignment of channels by the service provider. As discussed more fully subsequently, the channel status information provided by the monitoring system 105 is maintained as a subset of circuit repository data 107, which is leveraged by the monitoring system 105 for validating the accuracy of a determined discrepancy.

As seen in FIG. 1B, the subsystems 103a of a service provider (e.g., a telecommunication company) may also include systems, such as a physical provisioning system 121, a logical provisioning system 123, an engineering system 125, a field dispatch system 127, a procurement system 129, a trouble ticket system 130, a finance/accounting system 131, and a billing system 133. Provisioning, per the provisioning systems 121 and 123, focuses on using available capacity to provide services and includes network configuration, capacity activation, service assignment, installation and/or testing. This provisioning function can also address end-to-end connectivity, and assigning equipment, paths, circuit identifiers, network addresses (e.g., Internet Protocol (IP) addresses) and customer numbers.

The physical provisioning system 121, according to one embodiment, monitors and controls the provisioning of various network resources to particular customers, such as by designing physical circuits that need to be placed in the field. Physical provisioning system 121 stores information about the circuits and their design, about various network elements, customers using the circuits, circuit bandwidth and the like. The logical provisioning system 123 can address OSI (Open System Interconnection) Layer 2/3 provisioning. As such, system 123 assigns and activates logical ports, assigns Internet Protocol (IP) ranges and addresses, and the like.

The engineering system 125 can support the functions of the engineering group. For example, the engineering group has responsibility for conduit runs, buildings, equipment, equipment bays, optical fibers within underground ducts, telephone poles, radio base stations, etc. With respect to these assets, the engineering group is also concerned with engineering limitations, environmental factors, and geospatial horizontal and vertical coordinates of equipment. Accordingly, engineering system 125 can track and store data relating to these equipments and concerns.

The field dispatch system 127 operates in conjunction with the validation system 105 to coordinate the dispatch of technicians to address outages and equipment failure, for example, as well as the provisioning systems 121 and 123 to perform any necessary installations. In particular, dispatch system 127 may monitor and control allocation of workforce to perform various tasks needed to provide customers with various services, such as set-up and maintenance of customer's services with respect to placed orders.

In addition, a procurement system 129 can be utilized by the service provider to coordinate with other service providers and/or equipment manufacturers to acquire assets. Finance/accounting system 131 provides financial planning and analysis support of the network and services. Furthermore, the finance/accounting system 131 is involved in asset management, for example, to the extent that monies relating to the procurement of equipment and services need to be accurately accounted for and suppliers need to be paid. Billing system 133 provides invoicing capability for the services and/or products provided by the service provider network 109 to customers. For instance, billing system 133 performs the following activities: account activation and tracking, service feature selection, selection of billing rates for specific calls, invoice creation, payment entry and management of communication with the customers.

It is recognized that one or more of these systems 121-133 can be utilized, as well as additional systems, depending on the particular requirements of the service provider. Furthermore, the functionality of the sub-systems may vary with the service provider. For the purpose of illustration, a monitoring system 105 and various provisioning systems 106 (e.g., off-net provisioning tools) are shown separately. It is noted, however, that these too may be included as the various sub-systems 103a-103n.

According to one embodiment, the validation system 101 receives, from the plurality of different provisioning systems 106, data for indicating the current provisioning of the assets of the service provider network 109-115. Once received, the validation system 101 employs various data mapping, data cleansing, transformation and other processing techniques to generate a standardized collection of the data. In certain embodiments, the standardization procedure is carried out based on channel status data provided by the monitoring system 105 as well as user defined data types and categories as input to the monitoring system 105. Still further, one or more standardization models or templates (e.g., data definition tables) may be used for supporting data mapping. The resulting standardized collection is representative of a coordinated, generalized data set that accounts for the various data types, requirements, nuances and similarities of the respective provisioning systems 106. By way of example, a first and second provisioning system P1 and P2 respectively may be configured to gather and process data for indicating how assets for a specific portion of the service provider network 109 are provisioned. While the different provisioning systems P1 and P2 may represent provisioning data such as current allocation status, order status, request status, etc., differently, the validation system 101 employs various criteria and models for enabling the data types to be integrally mapped.

The resulting standardized data set, which represents a subset of data regarding retrieved from the various provisioning systems 106, is then stored to a circuit repository database (CRD) 107. By way of example, the CRD 107 is a circuit centric database structure that includes the current ACTIVE, DISCONNECTED or PENDING circuit status and a History of all Service Orders that affect the circuit status. The CRD 107 also includes the Access Service Requests (ASR) and Local Service Requests (LSR) orders and order history data associated with each circuit within the service provider network.

In addition to the data provided by the various provisioning systems 106, the CRD 107 also maintains circuit-channel status data, per the monitoring system 105. By way of example, the validation system 101 stores data provided by the monitoring system 105, including channel availability information, discrepancy reasons, etc. It is noted, in certain implementations, that the status data may also be standardized per the criteria and/or standardization models employed for processing of the provisioning data. Alternatively, in the case where the monitoring system is a native or primary tool, the data provided by the monitoring system is not standardized. Rather, the criterion for defining the various data types and structures of the status data is used for enabling standardization of the provisioning data accordingly.

In one embodiment, the validation system 101 analyzes the standardized data, as maintained via the CRD 107, to validate a discrepancy between the status data conveyed by a monitoring tool relative to a circuit and/or channel versus data conveyed by the one or more provisioning systems 106. Under this scenario, the monitoring system 105 may leverage the data maintained in the CRD 107 or a subset thereof to identify and subsequently validate the accuracy of the identified channel disparities.

By way of example, the monitoring system 105 may determine a specific channel is BLOCKED, therefore rendering the channel unavailable. However, the validation platform 101 may analyze the CRD 107 to determine the current status of the circuit from which the associated channel originates is indicated as CLEAR, meaning it is currently available. Under this scenario, the validation platform 101 performs various analysis procedures to determine whether a resulting discrepancy is valid or invalid. Validity may correspond to a determination that a sufficient match exists between one or more different data types employed by the systems despite the fact that the end results differ. Invalidity may be based on a determination that the disparity is the result of data type incompatibility between the monitoring system 105, several of the provisioning systems 106, or a combination thereof. In addition, the validity analysis may include determining whether more data is needed to arrive at a conclusion as to the cause of the disparity.

Still further, the analysis may render specific discrepancy types for indicating the nature of the discrepancy or state of a given circuit channel underlying the discrepancy. This may include, for example, an occurrence of a disconnection or cancellation of a long distance request for a given channel, a pending telecommunication transfer for a given channel, a missing change order request, an abandoning of a blocked channel, a rejection of an access service request, etc. It is noted, in certain instances, that the analysis may be performed automatically by the validation system 101 based on historical occurrences of such discrepancies or the CRD 107 data. In other instances, the validation system 101 may prompt the user to provide additional data required to derive or interpret an analysis result. Under this scenario, the validation system 101 generates a notification message to be presented via the monitoring system 105 or a dedicated user interface of the validation system 101. The notification message may indicate specific additional data required to determine are result (e.g., discrepancy type) per the analysis.

In certain embodiments, the validation system 101 also determines one or more requirements for addressing and/or eliminating the discrepancy. By way of example, the requirements identify specific actions required for performance by the service provider via the monitoring system 105, a specific provisioning system 106, the various other sub-systems 103a-103n, or via manual execution within the service provider network. Hence, the requirements are based on the identified discrepancy types, which further correspond to the particular system in which the discrepancy occurred. Requirements may include, for example, in the case of a parent/child circuit channel connection, causing a disconnection in the parent to be replicated in the child (downstream) circuit. Other requirements may include, for example, specifying requirements for resolution of an ASR data issue, completing or releasing an old multiplexer connection, or notifying a specific member of the service provider of a channel request needing to be reconciled.

Of note, the requirements may vary depending on system characteristics and criteria associated with the service provider network. The validation system 101 can be adapted to accommodate the needs of differing service provider network configurations, system requirements, etc.

Figure 1C:
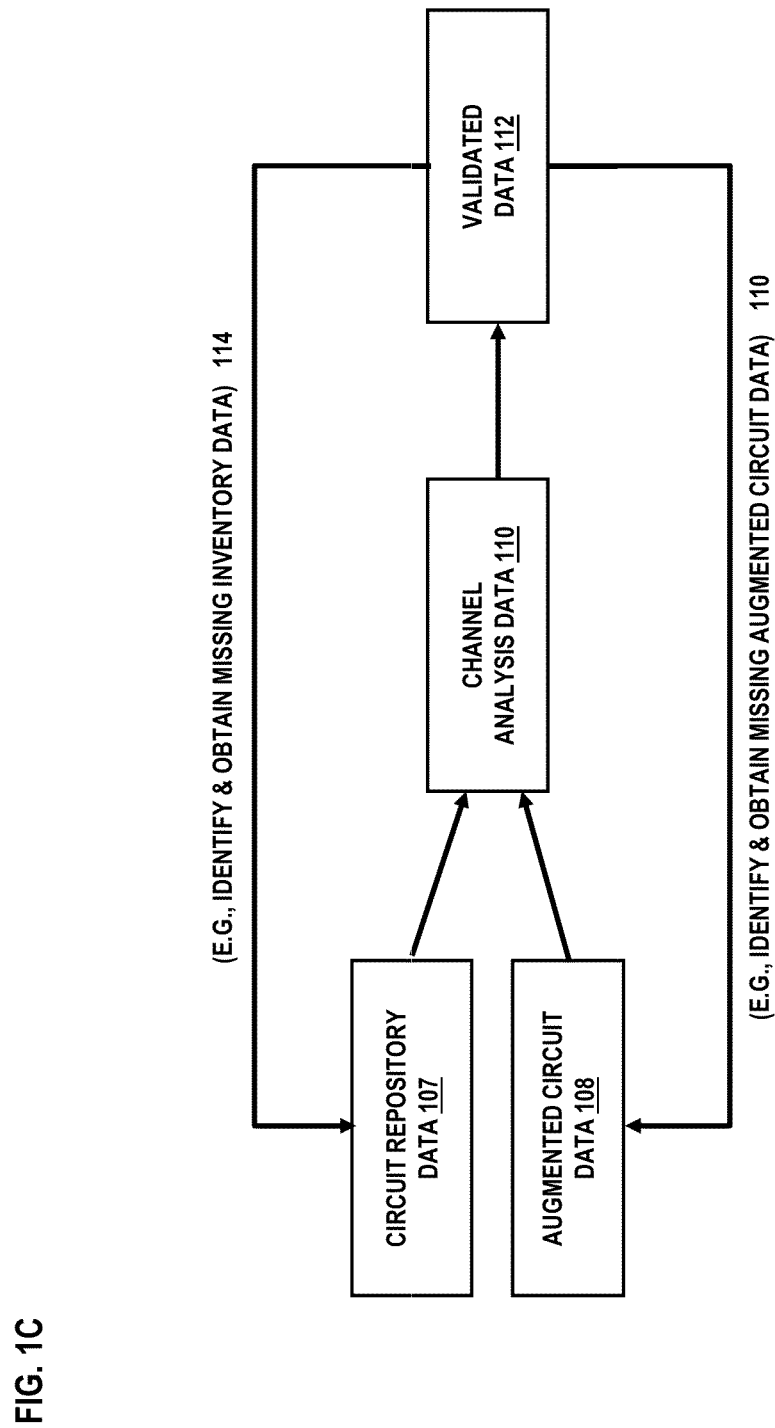
FIG. 1C is a diagram of a closed loop data collection and validation process performed by the system of FIGS. 1A and 1B, according to various embodiments.

Moreover, it is noted, in certain embodiments, that the analysis results and requirements information are further stored to the CRD 107, such as in accordance with the exemplary closed loop data collection and validation scheme of FIG. 1C. For instance, in certain embodiments, the validation system 101 refines the CRD 107 with the provisioning data, circuit-channel status data and analysis results and requirements data. The augmented data 108 is provided as feedback, i.e., per line 116 to the monitoring system 105. Under this scenario, the augmented data 108 may include various channel status data elements that were not initially determined by the monitoring system 105 but rather as a result of evaluation of provisioning data by the validation system 101. This may include data for enabling the monitoring system 105 to determine if a specific channel is available or the reason for unavailability the channel.

Still further, the augmented data may initially be defined according to specific data elements of interest to be retrieved by the validation system 101 from the various provisioning systems 106 and the monitoring system 105. For example, this may include entry of various user defined data types and categories related to the various provisioning systems 106 or the monitoring system 105 in a table, which is then provided to the validation system 101 as channel analysis data 110 for use in interpreting data stored as CRD 107. The table may include, for example, a row for defining the specific name of a data field corresponding to the particular system and another row for providing a description of the field. In addition, several of the fields may be delineated across parent and child circuit and/or status relationships for accommodating various arrangements of circuits. Still further, additional elements may be defined within the table in the case of multiplexer (MUX) based circuits. An exemplary set of tables (e.g., data definition tables) for defining the various channels and circuit types, exemplary provisioning systems P1 and P2 and the monitoring system 105 are shown below:

TABLE 1

| CHANNEL STATUS FIELD NAME | TABLE NAME: SYS-CHANNEL-STATUS FIELD DESCRIPTION |
| --- | --- |
| PAR-OWNER | Parent Owner Name |
| PAR-CIR | Compressed Parent Circuit ID |
| STATUS-TYPE | Provisioned or Installed Status Indicator |
| PAR-CIR-TYPE | Parent Circuit Type |
| PAR-SRV_TYPE | Parent Service Type |
| PAR-STATUS | Parent Circuit Status (Native) |
| PAR-STATUS-DT | Parent Status Assignment Date |

TABLE 1-continued

| | |
|---|---|
| PAR-SPEED | Parent Circuit Speed |
| PAR-BWIDTH | Parent Bandwidth |
| CHANNEL | Parent Channel ID |
| CHNL-STATUS | Parent Channel Status (Native) |
| CHNL-STATUS-DT | Channel Status Assignment Date |
| CHNL-STATUS-USR | Channel Status Assignment User |
| CHILD-CIR | Child Circuit ID (assigned to the channel) |
| CHILD-CIR-TYPE | Child Circuit Type |
| CHILD-SRV_TYPE | Child Service Type |
| CHILD-STATUS | Child Circuit Status (Native) |
| CHILD-STATUS-DT | Child Status Assignment Date |
| CHILD-SPEED | Child Circuit Speed |
| CHILD-BWIDTH | Child Bandwidth |
| UC-PARENT-CIR | Uncompressed Parent Circuit ID |
| UC-CHILD-CIR | Uncompressed Child Circuit ID |
| CHNL-REASON-CODE | Channel Status Reason or Block Code |
| CHNL-STATUS-RMRKS | Channel Status Remarks |

| PROVISIONING SYSTEM 1 (PS1)-REQUIREMENT FIELD NAME | TABLE NAME: PS1-ORDERS FIELD DESCRIPTION |
|---|---|
| PARENT-CIR | Parent Circuit ID |
| CHANNEL | Parent Channel ID |
| CHILD-CIR | Child Circuit ID (assigned to the channel) |
| MUX MSG-ID | PS1 Requirement ID (NSR) |
| MUX MSG-CREATE-DT | PS1 Mux MSG Create Date |
| MUX-STATUS | PS1 Mux MSG Status |
| MUX-COMP-DT | PS1 Mux MSG Complete Date |
| MSG-TYPE | PS1 Mux MSG Type |

| PROVISIONING SYSTEM 2 (PS2)-REQUIREMENT FIELD NAME | TABLE NAME: PS2-CHANNEL-STATUS FIELD DESCRIPTION |
|---|---|
| PARENT-CIR | PS2 Connection Facility Assigned Circuit |
| CHANNEL | PS2 Connection Facility Assigned Channel |
| CFA-CHNL-STATUS | PS2 Connection Facility Channel Status |
| CFA-VALIDATE-DT | PS2 CFA Validation Date |
| ICSC-ID | ICSC-ID of Carrier Checked |
| PARENT-SPEED | Parent Circuit Speed |
| Other Fields | All other CFA Validation Response Fields Data |

| MONITORING SYSTEM (MS) CIRCUIT REQUIREMENT CIRCUITS FIELD NAME | TABLE NAME: MS-CIRCUITS FIELD DESCRIPTION |
|---|---|
| RECID | CRD Assigned Record Number |
| CIRCUIT ID | Uncompressed Parent Circuit ID |
| CMPRS PARENT CKT | Compressed Parent Circuit ID |
| CIRCUIT OWNER | System Name of Parent Circuit Owner |
| REGION | Geographic Sales Region |
| BANDWIDTH | Parent Circuit Bandwidth |
| ECCKT OWNER | ICSC ID of Parent ECCKT Provider |
| ECCKT | Uncompressed Parent ECCKT |
| P CMPRS ECCKT | Compressed Parent ECCKT |
| VALIDATION DATE | MS Record Validation Date |
| PREV FAILURE REASON | MS Validation Process Failure Reason |
| ACTIVE | Number of Active Channels |
| SPARE | Number of Spare Channels |
| BLOCKED | Number of Blocked Channels |
| MISMATCH | Number of Mismatched Channels |
| CURR FAILURE REASON | MS Validation Process Failure Reason |

| MONITORING SYSTEM CHANNEL STATUS REQUIREMENT CHANNELS FIELD NAME | TABLE NAME: MS-CHANNELS FIELD DESCRIPTION |
|---|---|
| REC ID | CRDW Assigned Record Number |
| CIRCUIT ID | Uncompressed Parent Circuit ID |
| CMPRS PARENT CKT | Compressed Parent Circuit ID |
| CHANNEL NUMBER | Parent Circuit Channel ID Number |
| STATUS 1 | MS Provisioning View Channel Status |
| STATUS 2 | MS Installed View Channel Status |
| STATUS 3 | MS Carrier Channel Status |
| STATUS ALL | Concatenated MS Status 1, 2 & 3 |
| LEC CIRCUIT | Uncompressed Child Circuit ECCKT |
| CMPRS ECCKT | Compressed Child Circuit ECCKT |

TABLE 1-continued

| | |
|---|---|
| CHILD CKR | Uncompressed Child Circuit ID |
| CMPRS CHILD CIR | Compressed Child Circuit ID |
| NP 12CHR CHILD | 1st 12 Characters-Compressed Child Circuit ID |

By referencing the various tables, the validation system 101 can recognize and retrieve specific subsets of data for determining channel status values for a given circuit (e.g., by circuit identifier), when it was assigned, who assigned it and the reason a channel status was assigned per the specific provisioning system (e.g., PS1 versus PS2). As such, the various values associated with the channel data, including channel allocation or discrepancy reason codes, may be identified by the validation system 101 accordingly. Per FIG. 1C, the augmented circuit data 108 may be provided to the validation system 101 in combination with the circuit repository data 107 to compile the channel analysis data 110. The channel analysis data 110 may include a specific subset of data, including requirements, resolutions, etc., for use in validating the accuracy of a perceived discrepancy to generate a validated data set 112 or to resolve the discrepancy.

In certain embodiments, the validated data set 112 is generated based on analysis of the channel analysis data 110. By way of example, each of the above described data elements within the table are compared to related sets of CRD 107 data for each circuit-channel to be analyzed. The result of each comparison is then written as the validated data 112—i.e., as another data table—wherein the common types of comparison results are grouped together to simplify the results review. An outline of the initial validated data 112 analysis results data groups is provided in TABLE 2 below.

TABLE 2

| DATA GROUP | DATA GROUP DESCRIPTION |
|---|---|
| Source Circuits-Channels Data | The minimum Source (Key) fields that uniquely identify the Parent, Channel, Child & Exchange Company Circuit (ECCKT) IDs |
| Participating Systems Group | A set of fields that identifies the participating systems for the specific Circuit-Channel |
| Assigned-Exists Group | A set of fields that identify if the participating systems, the monitoring system and the CRD have the Circuit Assignments or if the order records exist in the CRD |
| PS1 Status Group | PS1 Parent Circuit, Channel & Child Circuit Status values and assignment dates |
| PS2 Status Group | PS2 Parent Circuit, Channel & Child Circuit Status values and assignment dates |
| ... | ... |
| ... | ... |
| PSN Status Group | PSN Parent ECCKT, Channel & Child ECCKT Status values and assignment dates |
| CRD Status Group | CRD Parent Circuit/ECCKT, Channel & Child/ECCKTS Circuit Status values and assignment dates |
| Monitoring System Status Group | CRD Provisioning, Installed and Carrier Status values and Validation Date |
| Channel Status Duration Group | A set of fields identifying the calendar days and years the channel has been in the current status for each participating system |
| CRD Child Circuit Match Group | A set of fields that identify if the participating systems and CAMEO Child Circuit ID match the CRDW Records |
| Monitoring System Child Circuit Match Group | A set of fields that identify if the participating systems Child Circuit ID values match the CAMEO Record |
| Last Order Data Group | A set of key fields containing the Last Completed Order fields from the CRDW |

TABLE 2-continued

| DATA GROUP | DATA GROUP DESCRIPTION |
|---|---|
| Last Bill Data Group | A set of key fields containing the Last Cost Billing Data fields from the CRD |
| ICSC & ECCKT Match Group | A set of fields that identify if the owning system Interexchange Customer Service Centers (ICSC) ID and ECCKT values match the CRDW ICSC ID and ECCKTS for the channel |
| Different ECCKTS Group | A set of fields containing the different Parent and Child Circuit ECCKTS when the participating systems do not match the CRD or Monitoring System records |

By augmenting the CRD 107 as described above based on continual feedback data, i.e., lines 116 and 114 of the initial tables, the CRD 107 may be refined over time for supporting the analysis and resolution of subsequent discrepancies per incoming data from the monitoring system 105 and/or the various provisioning systems 106. In addition, the validation system 101 may operate in conjunction with the monitoring system 105 to support the channel access cost recovery needs of the service provider more readily. This includes expedited identification of discrepancies in various circuits or channel allocations, such that recovery of said channels enables more efficient use of the existing assets. This is supported by the feedback of inventory requirements data 114 for refining the CRD 107 as well as feedback 116 of augmented circuit data 108 for impacting the monitoring system 105, as shown in FIG. 1C.

Still further, persistent updating of the CRD 107 with feedback data, i.e., 110 and 114 in conjunction with enables the routine generation of comprehensive status, cost and analysis reports. Due to the standardization procedure performed on incoming data by the validation system 101, the reports unify the various data types or results provided by the plurality of disparate provisioning systems 106 with that of the monitoring system 105. As such, the user is rendered with a comprehensive, integrated view of the status and provisioning of the assets within the service provider network 109.

For illustrative purposes, the validation system 101 is implemented as part of a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions.

According to exemplary embodiments, end user devices (not shown) may be utilized to communicate over system 100 and may include any customer premise equipment (CPE) capable of sending and/or receiving information over one or more of networks 109-115. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

By way of example, telecommunications services of the service provider network 109 may provide media content or communication services (e.g., voice, data, video, etc.) to various customers (or subscribers) via customer system$_1$ . . . customer system$_N$. The customers can be individuals (or residences) that receive one or more media services from the service provider network 109, either directly or from a content provider via the service provider network 109. The customer could also be an entity, such as a corporation, enterprise, or organization, that receives one or more media services from the service provider network 109, either directly or from a content provider or via the service provider network 109. The various communication conduits used to provide one or more media services to the various customers are not expressly depicted in FIG. 1, and can include the use of any form of wired or wireless communication architecture (e.g., land-line, cable, fiber optic, satellite-based, cellular, or other communication architecture).

Figure 2:
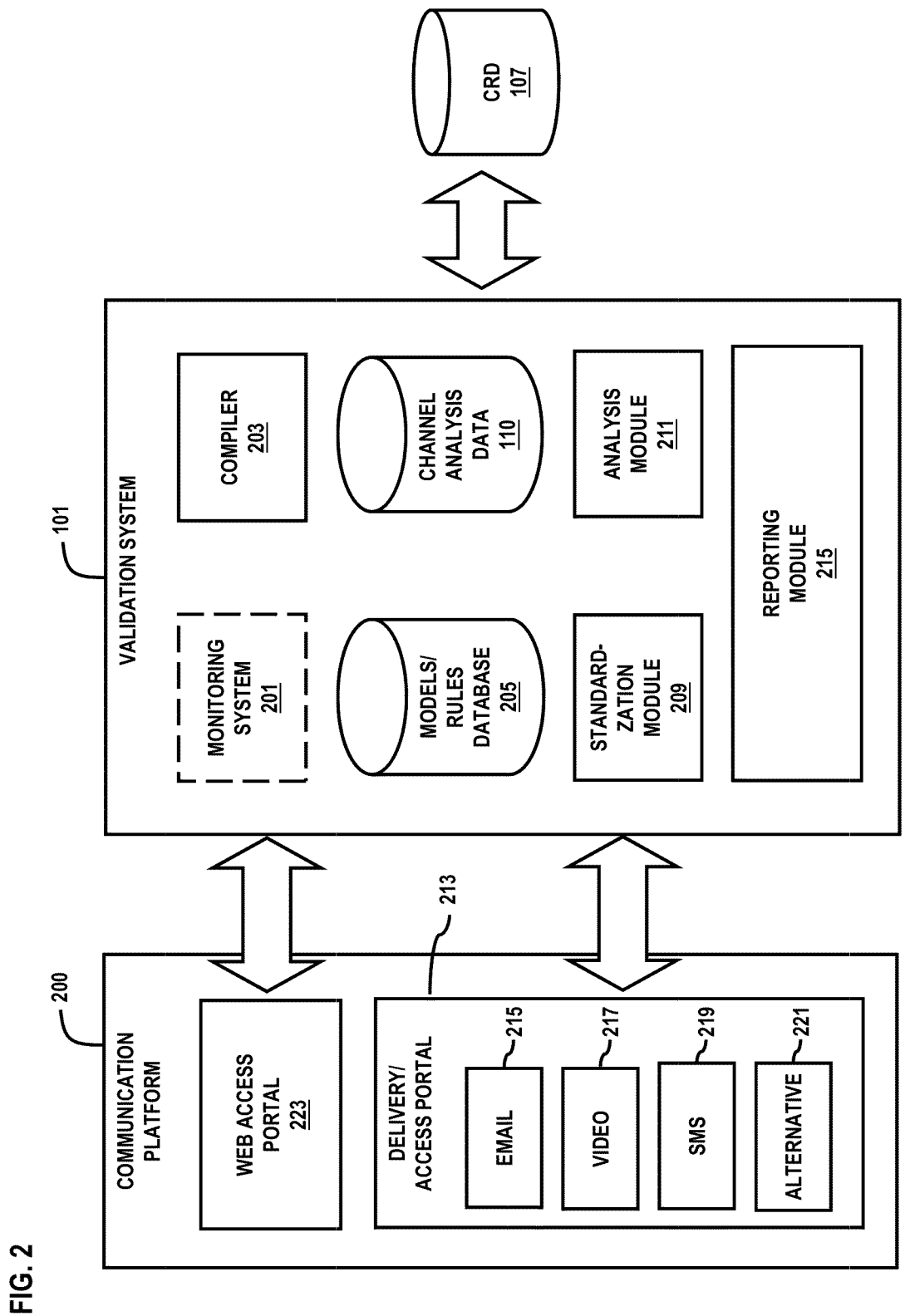
FIG. 2 is a diagram of a validation system of FIG. 1, according to one embodiments.
Figure 3D:
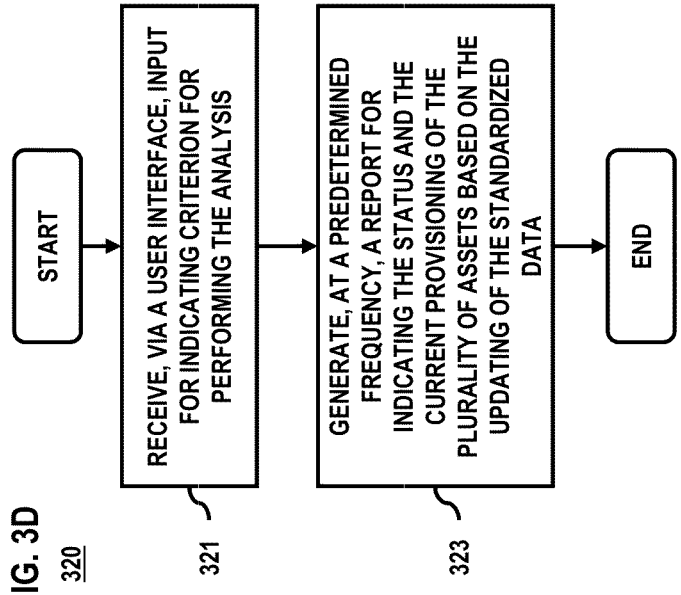
Figure 3C:
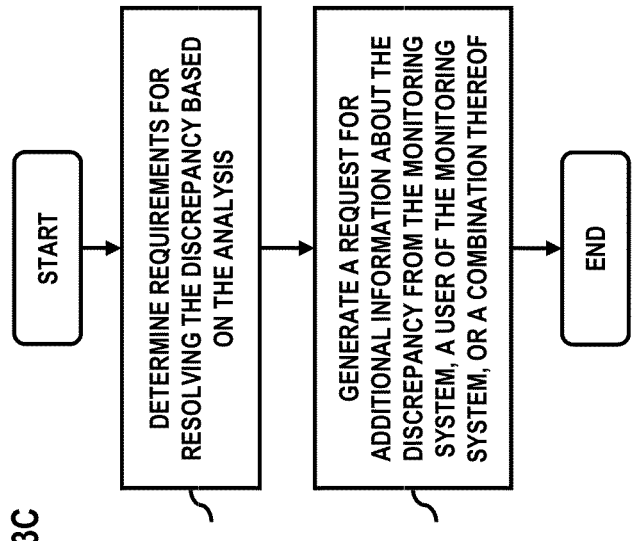

FIG. 2 is a diagram of an embodiment of the validation system 101 and a communication platform 200 used with an exemplary one of various subsystems of a service provider network for validating the status of various assets of a service provider network across disparate systems. The validation system 101 includes a monitoring system 201, which can either be integrated as part of the system 101 or may be a separate unit there from, a compiler module 203, a models/rules database 205, a channel analysis database 110, a standardization module 209, an analysis module 211, a notification module 213 and a reporting module 215.

In one embodiment, the monitoring system 201 is used to monitor events or activities associated with the various assets of the service provider network, including circuit-channel status information. This includes, for example, receiving signals for indicating a current usage or allocation of a specific channel or a detected bandwidth capacity use. In addition, the monitoring system 20 may coordinate the integration of user interface views between the monitoring system 105 and the validation system 101. As such, various notification messages, requests, recommendations and instructions generated per execution of the analysis module 211 for performing validation and/or resolving discrepancies are presented.

In one embodiment, the compiler 203 interfaces with the various active provisioning systems 106 to gather data provisioning data generated by each of the different systems per their respective circuits. By way of example, the compiler may initiate the required handshakes, permissions and data exchange protocols, relative to the particular requirements of the provisioning system, for facilitating data gathering. The compiler 203 may be configured, i.e., at the discretion of the service provider, for enabling on-demand data acquisition or periodic data acquisition. It is noted, in certain implementations, that status data generated by the monitoring system 201 may also be compiled.

In one embodiment, the standardization module 209 processes the data gathered by the compiler 203 against various data mapping, data cleansing, transformation and other techniques to generate a standardized collection of the data. In addition, the existing data within the circuit repository database 107 is analyzed, such as based on one or more data extraction and element mapping tables (e.g., TABLE 1), for enabling interpretation of the compiled data set. Resultantly, the standardized data is then stored to the circuit repository database 107. It is noted that the standardization procedure is carried out based on channel status data provided by the monitoring system 105 as well as user defined data types and categories as input to the monitoring system 105. The resulting standardized collection is representative of a coordinated, generalized data set that accounts for the various data types, requirements, nuances and similarities of the respective provisioning systems 106.

Once the data is standardized, it is stored to the CRD 107. In one embodiment, an analysis module 211 processes the CRD 107 to generate channel analysis data 110. The channel analysis data 110 may include, for example, data for indicating various user defined data types and categories related to the various provisioning systems 106 or the monitoring system 105. In certain embodiments, the channel analysis data 110 may be implemented as a data file, reference table, etc. Still further, the analysis module 211 extrapolates from the table, based at least in part on the various rules and defined user types, those elements that match the current CRD 107 for each circuit of the network (or each circuit subject to the analysis). The result of each comparison is then written as validated data 112, and subsequently passed on to the monitoring system 201, stored to the CRD 107, or used to trigger the reporting module 215.

It is noted that the analysis module 211 is configured, as a result of the analysis, to render a validity or invalidity result. In addition, the analysis module 211 may operate in connection with the notification module 213 to enable generation of one or more notification messages, i.e., message prompts, for indicating the validity or invalidity determination. The notification module 213 may also generate one or more requirements notification messages for indicating the various analysis results (conclusions) determined pursuant the analysis and any associated resolution options.

In one embodiment, the reporting module 213 generates reports for indicating current and historical status information, current and historical provisioning data, and various metrics regarding the current state of the service provider network and the various assets thereof. The reporting module may be customized by a user to automatically generate reports according to a predetermined frequency or in accordance with a specified format. In addition to generating reports, the reporting module operates in connection with the notification module 213 to enable the rendering of notification messages, instructions and other communiqué for review by the user per execution of a validation. Still further, the reporting module 2015 may operate in connection with the communication platform 200, for enabling the rendering and exchange of data with a user or manager of the various subsystems of the service provider network 109.

The communication platform 200 is provided to allow for automated status and notification messages to be sent. Such messages can be presented either as a one way communication, or in an interactive manner so that a receiving system is given an ability to communicate further information to the validation system 101 and/or to request and retrieve additional information (e.g., using web links, or telephone menus, email addresses, etc.).

The communication platform 200 includes a delivery/access portal 213 having an email portal 215, a video portal 217, an SMS portal 219 an alternative portal 221 for using any alternative manner of communication. The communication platform 200 also includes a web access portal 223. The communication platform 200 allows the validation system 101 to automatically send inventory discrepancy and status summary updates as required, and/or permits proactive access and retrieval of such inventory discrepancy and status summary updates via such automated portals (e.g., web sites) 213, 223 as may be desired. For example, upon updating of the CRD 107, the notification application 211 could direct a web communication to a web address for another of subsystems 121-133 to obtain further information relating to a detected asset discrepancy, or to obtain historical data relating to the discrepancy status, etc.

FIGS. 3A-3D are flowcharts of a process for analyzing data generated by multiple provisioning systems to validate the status of various assets of a service provider network, according to various embodiments. In one embodiment, the validation system 101 performs processes 300, 310, 316 and 320.

In step 301, the validation system 101 retrieves, from a plurality of different provisioning systems, data for indicating a current provisioning of a plurality of assets of a service provider. In another step 303, the validation system 101 retrieves, from a status monitoring system, data for indicating a status of the plurality of assets. As such, the validation system is able to gather intelligence pertaining to both the current monitored status of various channels affiliated with a given circuit as well as data for indicating the current use, allocation, or status of the circuit from a fulfillment perspective within the overall service provider network. In particular, however, the provisioning data from the disparate systems may feature discrepancies in determined results, due to data incompatibility, missing information, etc.

Hence, per step 305, the validation system 101 standardizes the data provided by the plurality of different provisioning systems and the monitoring system. As noted previously, the standardization may be performed based on channel status data provided by the monitoring system 105 as well as user defined data types and categories as input to the monitoring system 105. Still further, one or more standardization models or templates may be used for supporting data mapping. In step 307, the validation system 101 analyzes the standardized data to validate a discrepancy between the status and the current provisioning of the plurality of assets. By way of example, the discrepancy may be a contradictory status indication wherein a channel is indicated as BLOCKED by a provisioning system while the associated circuit is indicated as being available via the monitoring system. Under this scenario, the validation corresponds to a determination that the indicated channel status is accurate as well as the cause of discrepancies in available information.

It is noted that the validation system 101 is configured to validate across disparate provisioning systems and/or monitoring systems. In step 309, the validation system 101 provides as feedback to the monitoring system, requirements for resolving the discrepancy based on the analysis. The requirements may include, for example, specific actions required to be performed by the service provider via the monitoring system 105, a specific provisioning system 106, the various other sub-systems 103a-103n, or via manual execution. As noted, the requirements are based on the identified discrepancy types, which further correspond to the particular system in which the discrepancy occurs.

In step 311 of process 310 (FIG. 3B), the validation system 101 reanalyzes data provided by the provisioning system and/or data provided by the plurality of different monitoring systems based on the updated standardized data to determine whether the discrepancy is eliminated. This corresponds to the closed loop feedback scheme of FIG. 1C, wherein the validation system is continually refined to increase discrepancy identification, validation and resolution effectiveness. It is noted, that this corresponds to a dynamic learning methodology, wherein the system is tuned/trained to account for adaptations in the behavior of the system over time. Per steps 313 and 315, the validation system updates a plurality of elements of the standardized data based on the feedback and validates the standardized data based on the determination. As mentioned, the updated data set may include data not provided initially by the respective different provisioning systems, the status monitoring system, or a combination thereof. Hence, this may correspond to feedback lines 114 and 116 of FIG. 1C, wherein missing inventory and channel status data was provided to augment the existing CRD 107 or channel analysis data 110.

In step 317 of process 316 (FIG. 3C), the validation system 101 determines requirements for resolving the discrepancy based on the analysis. Per step 319, the validation system 101 generates a request for additional information about the discrepancy from the monitoring system, a user of the monitoring system, or a combination thereof. As noted, the resolution may be based on a plurality of discrepancy types associated with the plurality of assets, the plurality of provisioning systems, a plurality of user defined categories, or a combination thereof.

In step 321 of process 320 (FIG. 3D), the validation system 101 receives, via a user interface, input for indicating criterion for performing the analysis. The criterion is defined by way of the various user defined categories, which are further included within a data definition table. Per step 323, the validation system 101 generates, at a predetermined frequency, a report for indicating the status and the current provisioning of the plurality of assets based on the updating of the standardized data.

Figure 4:
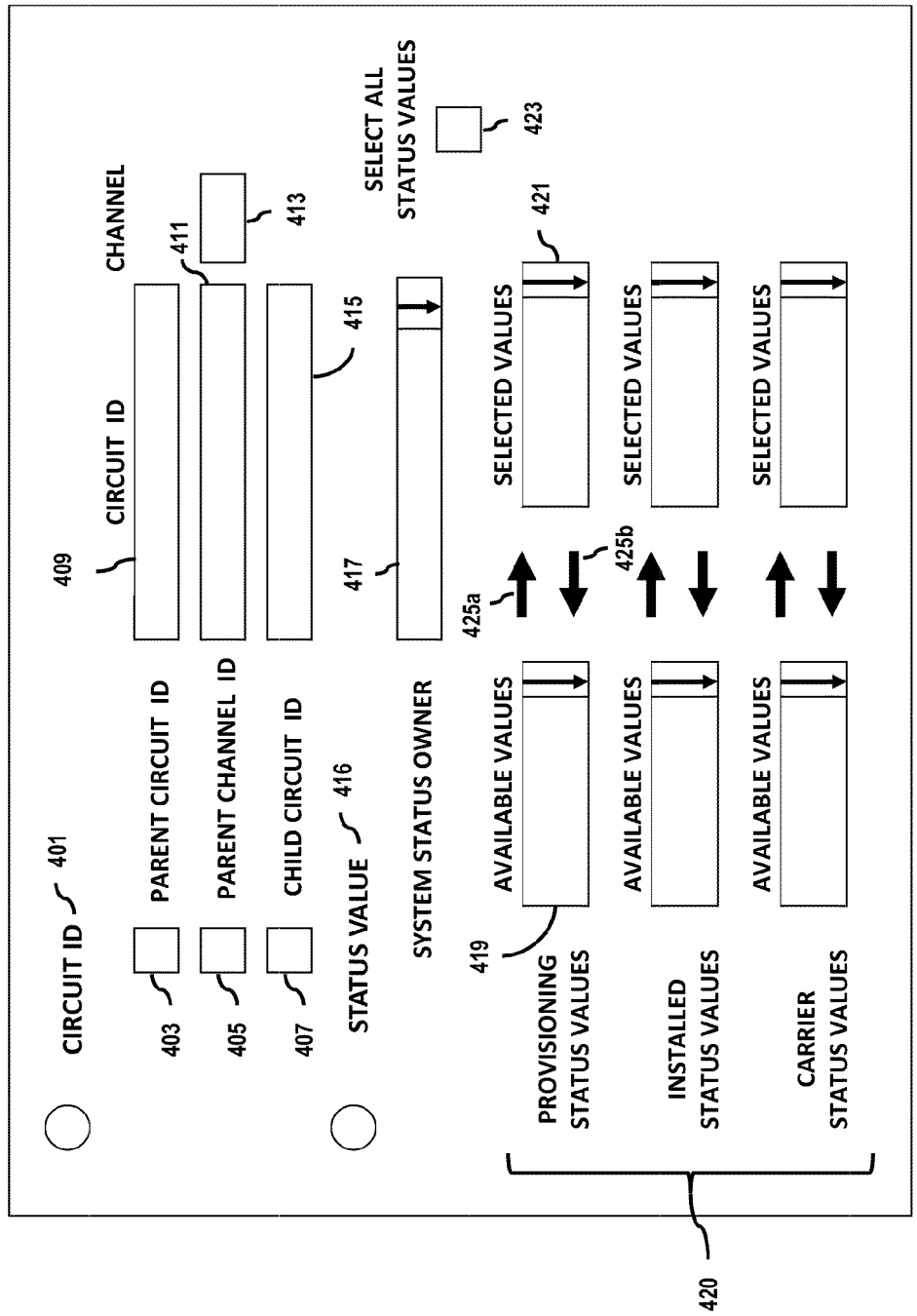
FIG. 4 is a diagram of a user interface for configuring the validation system of FIGS. 1A and 1B, according to one embodiment.

FIG. 4 is a diagram of a user interface for configuring the validation system of FIGS. 1A and 1B, according to one embodiment. The user interface 400 may be integrated for use in connection with the monitoring system 100. Alternatively, the user interface 400 may be dedicated solely to the validation system 101. For the purpose of illustration, the UI 400 is employed by the service provider to enable the configuration of initial filter criteria for extracting a subset of CRD 107. As noted previously, this corresponds to the establishing of the initial data table (e.g., Table 1), for defining the various user and data elements types/categories.

The interface 400 includes various selection options, including a section 401 for defining the circuit or channel that is to be subject to analysis. Checkboxes 403-407 may be selected by the user for corresponding to selection of a parent circuit, parent channel and child circuit respectively to specify. Corresponding to each checkbox 403-407 are data entry fields 409, 411 and 415 respectively, which receive as input the identification values of a respective circuit or channel to be subject to analysis/validation. In the case of a channel selection, an additional data entry field 413 is provided for enabling the user to specify the particular channel value.

A status value section 416 is also presented for enabling the user to define status and provisioning criteria. For example, a drop down menu 417 is provided for enabling the user to select an owner, i.e., as a specific point-of-contact, for managing or monitoring the above selected channels or circuits. Also, one or more status selection options 420 are presented, including those for enabling the defining of provisioning status values, installed status values and carrier status values. The status values will vary depending on the circuit or channel identified above. For example, a specific range or group of provisioning status values is presented in a availability window 419 based on a particular circuit identifier being selected while a different range or group is presented within the window 419 for another.

The user may highlight specific provisioning status values that appear in the window 419, i.e., select multiple values using a mouse and the CONTROL key of a keyboard of an associated computer. The user may then select those values by activating the filter action button 425a, which filters those particular values from the total set of available values. The selected values are then presented in a selection window 421. Under the scenario where the user is required to unselect a value, the user highlights a value appearing in the selection window 421 and then activates the unfiltered action button 425b. This process is repeated for the various other value categories as well (e.g., installed status values). The user may also activate checkbox 423 to enable selection of all status values. In the case of the provisioning status values, this corresponds to a scenario wherein all available values appearing in window 419 would automatically be populated into window 421 upon selection of checkbox 423. Of note, a wildcard value * may be used for any of the three categories of specific status values.

The configuration interface 400 enables the user to customize and/or access the channel analysis data set (e.g., 110 of FIG. 1C) and the validated data set (e.g., 112 of FIG. 1C). In addition, while not shown, additional interface options may be provided to enable the user to further filter the groups of data using specific values within groups of data. Under this scenario, the groups of data and specific values per field are to be accounted for in the channel analysis data set 110 and validated data set 112 (e.g., as table definitions). The user interface 400 may also include a note editor for enabling users to add remarks to analysis records and capture the user's associated identifier and date of entry of the remark.

Figure 5:
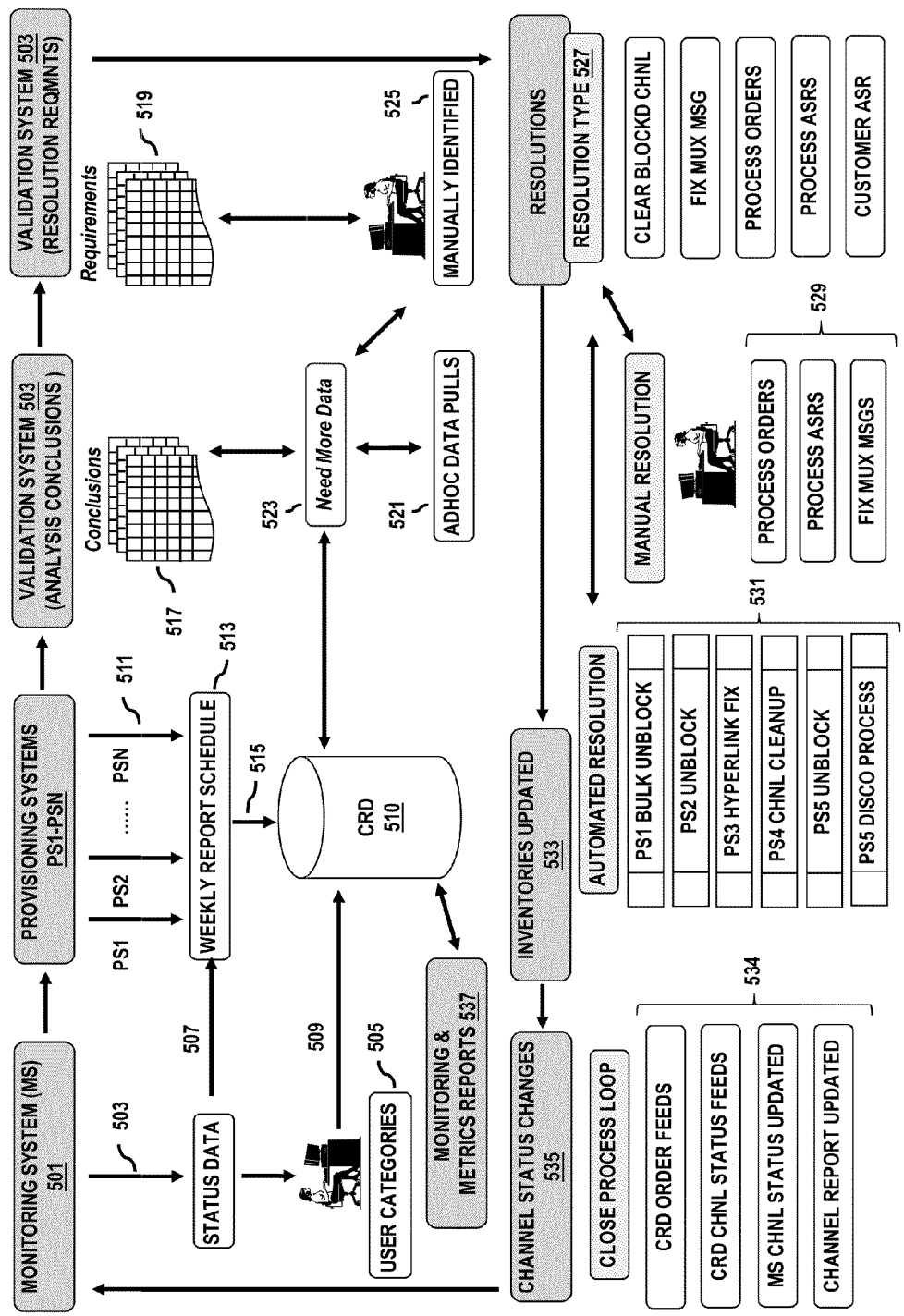
FIG. 5 is a diagram of a use case depicting a closed loop data collection and validation process, according to one embodiment.

FIG. 5 is a diagram of a use case depicting a closed loop data collection and validation process, according to one embodiment. For the purpose of illustration, the use case is presented from the perspective of a service provider employing three different provisioning systems PS1-PSN for use in connection with a grouping of circuits. In addition, the service provider employs a monitoring system 501. It is noted that each of the provisioning systems PS1-PSN have different data definitions and types.

Per the closed loop data collection process, the monitoring system 501 generates and/or retrieves status data regarding a channel, corresponding to action 503. The data may indicate a particular channel is inactive, unavailable, blocked, or any other type of condition status type as defined per the monitoring system 501 or as per one or more defined user categories 505. The validation system 101 interfaces with the monitoring system 501 to enable retrieval and subsequent storing of the status data and the user categories (if applicable) to a circuit repository database (CRD) 510, corresponding to actions 507 and 509 respectively. It is noted that the status information may be retrieved on a predetermined basis, i.e., per a weekly reporting (auditing) schedule 513.

In addition to the gathering of status data, provisioning data maintained by respective provisioning systems PS1-PSN is retrieved by the validation system 503, corresponding to action 511. The provisioning data is also retrieved and stored to the CRD 510 according to a predetermined schedule 513. Hence, the validation system 503 facilitates the concurrent retrieval of status data and provisioning data. This data is then standardized and stored to the circuit repository database 510 accordingly, corresponding to action 515. As noted earlier, the standardization is carried out based on the user defined categories 505, which may include one or more tables for initially defining the data collected by the monitoring system 501 and PS1-PSN.

The validation system 503 continues the process by analyzing the CRD 510 to determine one or more conclusions 517 and/or requirements 519. The analysis may render specific discrepancy types for indicating the nature of the discrepancy or a state of a given circuit channel underlying the discrepancy. This may include, for example, an instance wherein PS1 determines an active child circuit branching from a disconnected parent circuit (e.g., USED status); while PS2 determines the child circuit is available (e.g., SPARE status). For this discrepancy, the validation system 503 may generate a request 523 for additional data from one or more sources, including performance of an ad-hoc data pull 521 from various inventory systems or subsystems. In addition, the request may be directed to specific owners/points-of-contact for manual intervention 525. Hence, it is noted that the validation system 503 may generate the necessary notifications or execute the required actions for retrieving and/or requesting any additional data required to complete the analysis.

The additional information, per request 523, is stored to the CRD 510, which is then reanalyzed to derive a sufficient conclusion 517 and/or set of resolution requirements 519. In this example, the analysis conclusion 517 for the specified circuit is that the disconnected status of the parent was not sent downstream for the child. Based on this conclusion 517, the analysis of the discrepancy is validated. In addition, various requirements resolutions 519 for the validated discrepancy are also generated, corresponding to one or more resolution types 527. The resolution types 527 will vary depending on the specific system PS1-PSN or 501 to which the discrepancy type corresponds, and may include one or more manual or automated resolutions.

In the case of a manual resolution 529, the validation system 503 sends one or more notifications or requests for action to be taken by a point-of-contact 525. Manual resolutions 529 may include, for example, processing of a service order, processing of an ASR, or fixing of multiplexer based messages. Another resolution may include automated actions 531 such as unblocking of specified channels, updating of a broken hyperlink, performing a channel cleanup or enabling a disconnection process. In the above described scenario, the resolution requirement is to process the downstream disconnection to the child circuit, i.e., manually. It is noted the analysis conclusions 517 and resolution requirements 519 may be rendered to a user interface, i.e., of the monitoring system 501, for review by a user.

The validation system 503 monitors whether a response to a resolution is performed, and persistently provides feedback to the monitoring system 501 and the CRD 510. This includes updating inventory information 533 as well as updating channel status data. The updates correspond to the resolution actions taken per the resolution requirements 519. Updates 534 may include updating order feeds, channel status feeds, monitoring system channel status updates and updating of status reports. Per the specified schedule 513, the audit/status report 537 may also be generated to include various metrics. Hence, per closed loop processing, the system constantly receives updated channel status data 535 per incoming orders, circuit provisioning details and resolutions execution updates.

Execution of this closed loop procedure over time enables the service provider to readily validate discrepancies as well as generate comprehensive, integrated reports. Per the standardization features described herein, the validation system 503 is system agnostic, then enabling the service provider to adapt to any additional systems added or acquired over time. In addition, the feedback data collected by the validation system 503 may be used to perform predictive analysis of respective assets, including repair, maintenance, cost analysis, etc.

The processes described herein for analyzing data generated by multiple provisioning systems to validate the status of various assets of a service provider network may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
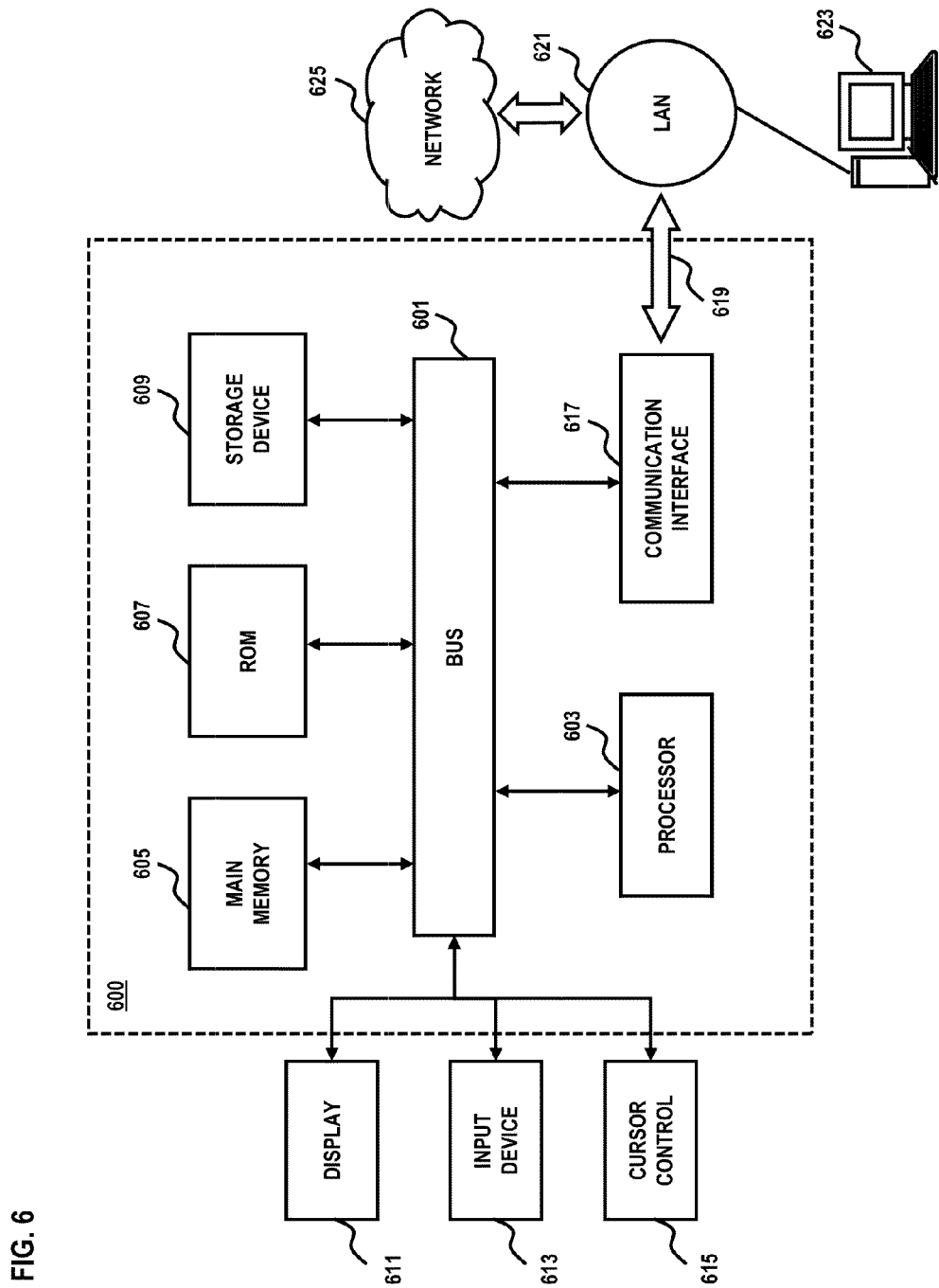
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 4, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements

What is claimed is:

1. A method comprising:
   retrieving, from a plurality of different provisioning systems, data for indicating a current provisioning of a plurality of assets of a service provider;
   retrieving, from a status monitoring system, data for indicating channel allocation and a status of the plurality of assets;
   standardizing the data provided by the plurality of different provisioning systems and the monitoring system based, at least in part, on the channel allocation;
   analyzing the standardized data to validate a discrepancy between the status and the current provisioning of the plurality of assets; and
   providing as feedback to the monitoring system, requirements for resolving the discrepancy based on the analysis.

2. A method of claim 1, further comprising:
   updating a plurality of elements of the standardized data based on the feedback,
   wherein the update includes data not provided by the respective different provisioning systems, the status monitoring system, or a combination thereof for further indicating the current provisioning of the plurality of assets, a current status of the plurality of assets, or a combination thereof.

3. A method of claim 2, further comprising:
   reanalyzing data provided by the provisioning system, data provided by the plurality of different monitoring systems, or a combination thereof based on the updated standardized data to determine whether the discrepancy is eliminated; and
   validating the standardized data based on the determination.

4. A method of claim 1, further comprising:
   determining requirements for resolving the discrepancy based on the analysis,
   wherein the resolution is based on a plurality of discrepancy types associated with the plurality of assets, the plurality of provisioning systems, a plurality of user defined categories, or a combination thereof.

5. A method of claim 4, wherein the requirements are performed automatically by the monitoring system, manually by a user of the monitoring system, or a combination thereof.

6. A method of claim 4, further comprising:
   generating a request for additional information about the discrepancy from the monitoring system, a user of the monitoring system, or a combination thereof.

7. A method of claim 1, further comprising:
   receiving, via a user interface, input for indicating criterion for performing the analysis,
   wherein the criterion is based on a structure of the data provided by the plurality of different provisioning systems, the plurality of elements of the monitoring system, the plurality of user defined categories, or a combination thereof.

8. A method of claim 1, further comprising:
   generating, at a predetermined frequency, a report for indicating the status and the current provisioning of the plurality of assets based on the updating of the standardized data.

9. A method according to claim 1, wherein the assets include physical circuits of a network of the service provider.

10. An apparatus comprising:
    at least one processor; and
    at least one memory including computer program code for one or more programs,
    the at least one memory and the computer program code configured to, with the at least one processor, cause the apparatus to perform at least the following,
    retrieve, from a plurality of different provisioning systems, data for indicating a current provisioning of a plurality of assets of a service provider;
    retrieve, from a status monitoring system, data for indicating channel allocation and a status of the plurality of assets;
    standardize the data provided by the plurality of different provisioning systems and the monitoring system based, at least in part, on the channel allocation;

analyze the standardized data to validate a discrepancy between the status and the current provisioning of the plurality of assets; and provide, as feedback to the monitoring system, requirements for resolving the discrepancy based on the analysis.

11. An apparatus of claim 10, wherein the apparatus is further caused to:

update a plurality of elements of the standardized data based on the feedback, wherein the update includes data not provided by the respective different provisioning systems, the status monitoring system, or a combination thereof for further indicating the current provisioning of the plurality of assets, a current status of the plurality of assets, or a combination thereof.

12. An apparatus of claim 11, wherein the apparatus is further caused to:

reanalyze data provided by the provisioning system, data provided by the plurality of different monitoring systems, or a combination thereof based on the updated standardized data to determine whether the discrepancy is eliminated; and validate the standardized data based on the determination.

13. An apparatus of claim 10, wherein the apparatus is further caused to:

determine requirements for resolving the discrepancy based on the analysis, wherein the resolution is based on a plurality of discrepancy types associated with the plurality of assets, the plurality of provisioning systems, a plurality of user defined categories, or a combination thereof.

14. An apparatus of claim 13, wherein the requirements are performed automatically by the monitoring system, manually by a user of the monitoring system, or a combination thereof.

15. An apparatus of claim 13, wherein the apparatus is further caused to:

generate a request for additional information about the discrepancy from the monitoring system, a user of the monitoring system, or a combination thereof.

16. An apparatus of claim 10, wherein the apparatus is further caused to:

receive, via a user interface, input for indicating criterion for performing the analysis, wherein the criterion is based on a structure of the data provided by the plurality of different provisioning systems, the plurality of elements of the monitoring system, the plurality of user defined categories, or a combination thereof.

17. An apparatus of claim 10, wherein the apparatus is further caused to:

generate, at a predetermined frequency, a report for indicating the status and the current provisioning of the plurality of assets based on the updating of the standardized data.

18. An apparatus of claim 10, wherein the assets include physical circuits of a network of the service provider.

19. A system comprising:

a plurality of different provisioning systems configured to maintain data for indicating a current provisioning of a plurality of assets of a service provider;

a monitoring system configured to monitor channel allocation and a status of the plurality of assets; and a validation system configured to standardize data provided by the monitoring system and the plurality of different provisioning systems based, at least in part, on the channel allocation, and to validate a discrepancy between the status data and data for indicating the current provisioning of the plurality of asset, wherein the validation system provides as feedback to the monitoring system, requirements for resolving the discrepancy.

20. A system of claim 19, further comprising:

a repository for maintaining the standardized data, wherein the validation is based on analysis of the standardized data.

* * * * *